(12) United States Patent
Meyer et al.

(10) Patent No.: US 12,523,758 B2
(45) Date of Patent: Jan. 13, 2026

(54) SYSTEMS AND METHODS FOR ONLINE CALIBRATION IN DISTRIBUTED APERTURE RADAR

(71) Applicant: GM Cruise Holdings LLC, San Francisco, CA (US)

(72) Inventors: Michael Meyer, Munich (DE); Jessica Bartholdy Sanson, Munich (DE); Marc Unzueta Canals, Munich (DE); Kalin Hristov Kabakchiev, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 400 days.

(21) Appl. No.: 18/446,439

(22) Filed: Aug. 8, 2023

(65) Prior Publication Data

US 2025/0028041 A1 Jan. 23, 2025

(30) Foreign Application Priority Data

Jul. 21, 2023 (EP) .................................. 23186888

(51) Int. Cl.
*G01S 13/86* (2006.01)
*G01S 13/90* (2006.01)

(52) U.S. Cl.
CPC ............ *G01S 13/865* (2013.01); *G01S 13/90* (2013.01)

(58) Field of Classification Search
CPC ...... G01S 13/42; G01S 13/865; G01S 13/937; G01S 7/4034; G01S 7/4091; G01S 7/403; G01S 7/417; G01S 13/87; G01S 13/90; G01S 13/931

See application file for complete search history.

(56) References Cited

U.S. PATENT DOCUMENTS

| | | | |
|---|---|---|---|
| 11,501,490 B2 * | 11/2022 | Gomez | G06V 10/75 |
| 11,887,271 B2 * | 1/2024 | Tang | G06T 19/20 |
| 12,189,024 B1 * | 1/2025 | Fina | G01S 7/4021 |
| 12,313,727 B1 * | 5/2025 | Das | G01S 7/417 |
| 2021/0397880 A1 * | 12/2021 | Deng | G06T 7/70 |
| 2022/0035376 A1 * | 2/2022 | Laddah | G06N 3/045 |
| 2022/0261590 A1 * | 8/2022 | Brahma | G06V 20/56 |
| 2023/0114899 A1 * | 4/2023 | Ay | G01S 7/03 342/70 |
| 2023/0260266 A1 * | 8/2023 | Karasev | G06T 3/4038 382/104 |
| 2023/0410490 A1 * | 12/2023 | Zhang | G01S 13/865 |
| 2024/0142590 A1 * | 5/2024 | Hu | G01S 7/4972 |
| 2025/0028041 A1 * | 1/2025 | Meyer | G01S 13/42 |
| 2025/0060475 A1 * | 2/2025 | Zhang | G01S 13/885 |

* cited by examiner

*Primary Examiner* — Peter M Bythrow
(74) *Attorney, Agent, or Firm* — CANTOR COLBURN LLP

(57) ABSTRACT

Technologies described herein relate to a distributed aperture radar (DAR) system that includes multiple radar sensors. A graph neural network (GNN) is employed to cause radar data output by the multiple radar sensors to correspond to a same coordinate system.

20 Claims, 5 Drawing Sheets

SYSTEMS AND METHODS FOR ONLINE CALIBRATION IN DISTRIBUTED APERTURE RADAR

RELATED APPLICATION

This application claims priority to European Patent Application No. EP 23186888.6, filed on Jul. 21, 2023, and entitled "SYSTEMS AND METHODS FOR ONLINE CALIBRATION IN DISTRIBUTED APERTURE RADAR". The entirety of this application is incorporated herein by reference.

BACKGROUND

Autonomous or assisted driving strategies have been facilitated through sensing an environment around a vehicle. Radar sensors are conventionally used in connection with detecting and classifying objects in an environment; advantages of radar over other types of sensors include robustness in regard to lighting and weather conditions. Employing two or more radar sensors (in comparison to a single sensor) increases the field of view of the detection system to provide a more comprehensive view of the surroundings. Before the radar data from multiple sensors can be processed, radar measurements from each radar sensor that correspond to the same target object need to be identified. Typically, the properties of the different radar signals—e.g., frequency, amplitude, and phase—can be compared to identify which radar signals correspond to the same target object. Radar gathered from radar sensors that each have a different view of the environment, however, cannot be associated in this way because the different distance and orientation of the radar sensor relative to the target object alters the properties of the received radar signal. One method of associating the radar data from multiple radar sensors having different fields of view employs known location and orientation of each radar sensor relative to one another to map radar data to a common coordinate system (where the radar sensors are located, for example, on a vehicle such as a car). This method, however, is associated with deficiencies. Specifically, even when location of one radar sensor is precisely known relative to another radar sensor, during normal driving conditions the location of the one radar sensor relative to the other can continuously change (e.g., due to normal vibration, a vehicle impacting a bump in a roadway, and so forth).

SUMMARY

The following is a brief summary of subject matter that is described in greater detail herein. This summary is not intended to be limiting as to the scope of the claims.

An example of a method performed by a radar system includes acts of receiving primary and secondary reflected radar signals at a primary and secondary radar sensors of a distributed aperture radar system and generating primary and secondary radar data with the primary and secondary radar sensors. The primary and secondary radar data include graphs that represent detections corresponding to a target object that is at least partially within a first field of view of the primary sensor and a second field of view of the secondary sensor. The method further includes calibrating the secondary radar data using a graph neural network to compensate for movement of the secondary radar sensor relative to the primary radar sensor and associating the graph of the primary radar data with the graph of the secondary radar data.

An example of a method of training a graph neural network to calibrate and associate radar data from a distributed aperture radar system includes simulating a distributed aperture radar system having a primary radar sensor, a secondary radar sensor, and a target object, where simulating the distributed aperture radar system includes simulating relative movement between the primary radar sensor and the secondary radar sensor. The method also includes generating primary radar data from the primary radar sensor and secondary radar data from the secondary radar sensor during simulation, where known relative locations of the primary radar sensor and the secondary radar sensor are known due to the movement between the radar sensors being simulated. The forms training data upon which a graph neural network can be trained. The method also includes training the graph neural network based upon the training data.

An example of a distributed aperture radar system includes a radar array and a computer. The radar array has: a first radar sensor having a first field of view; and a second radar sensor having a second field of view, the second field of view overlapping at least a portion of the first field of view. The first radar sensor generates first radar data comprising a graph that represents detections corresponding to the field of view (which includes a target object) and the second radar sensor generates second radar data comprising a graph that represents detections corresponding to the second field of view (which includes the target object). The computer has a processor and memory and is configured to: store the first and second radar data in the memory; provide the first and second radar data to a graph neural network, wherein the graph neural network is stored in the memory and is executed by the processor; use the graph neural network to determine a calibration matrix between the second radar sensor and the first radar sensor based on the first and second radar data; and use the calibration matrix to associate the graph of the second radar data with the graph of the first radar data.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
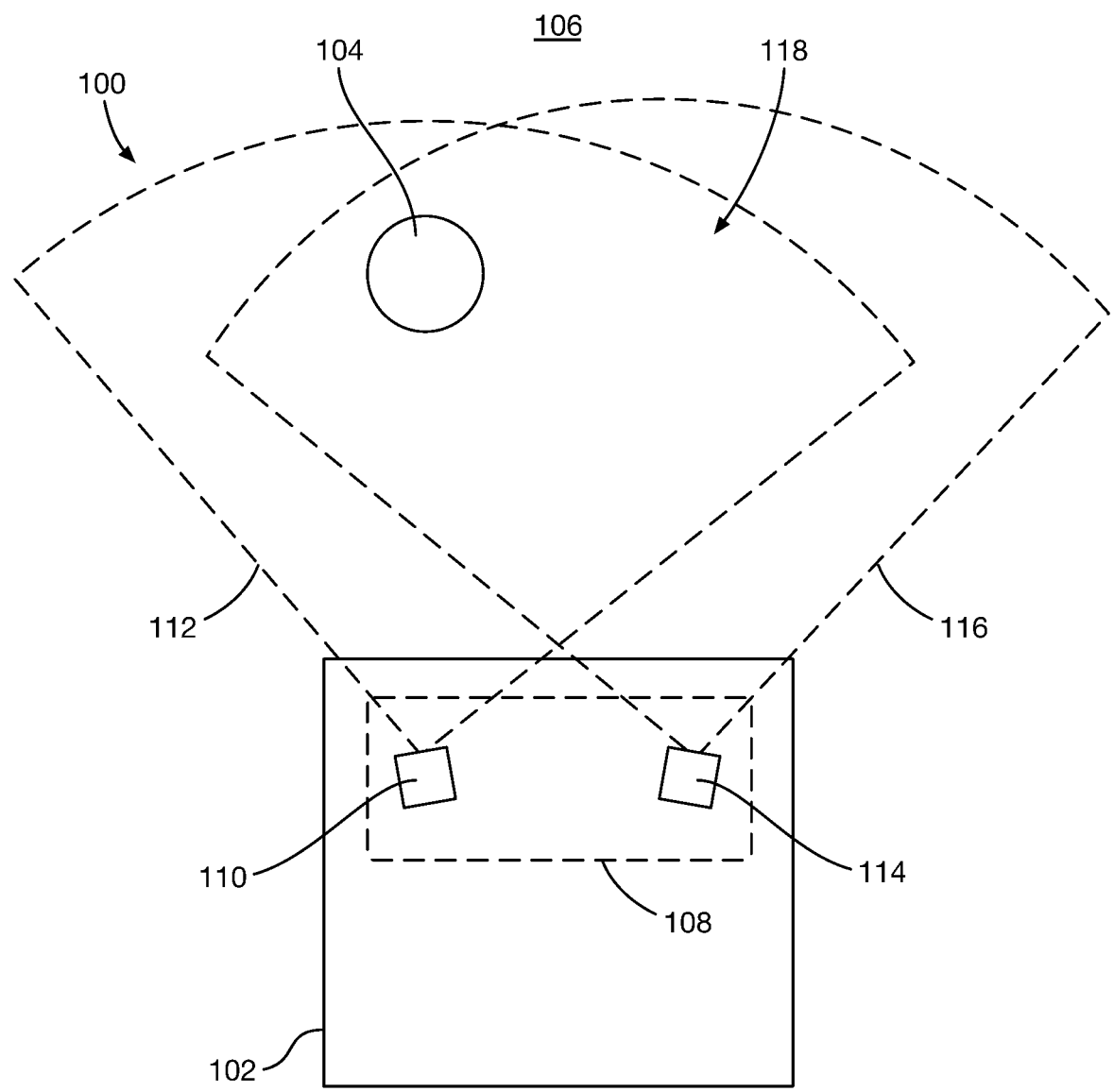
FIG. 1 illustrates a distributed aperture radar system used on a vehicle to detect objects in a scene.

Various technologies pertaining to a distributed aperture radar system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," "engine,", and the like are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something and is not intended to indicate a preference.

Figure 3:
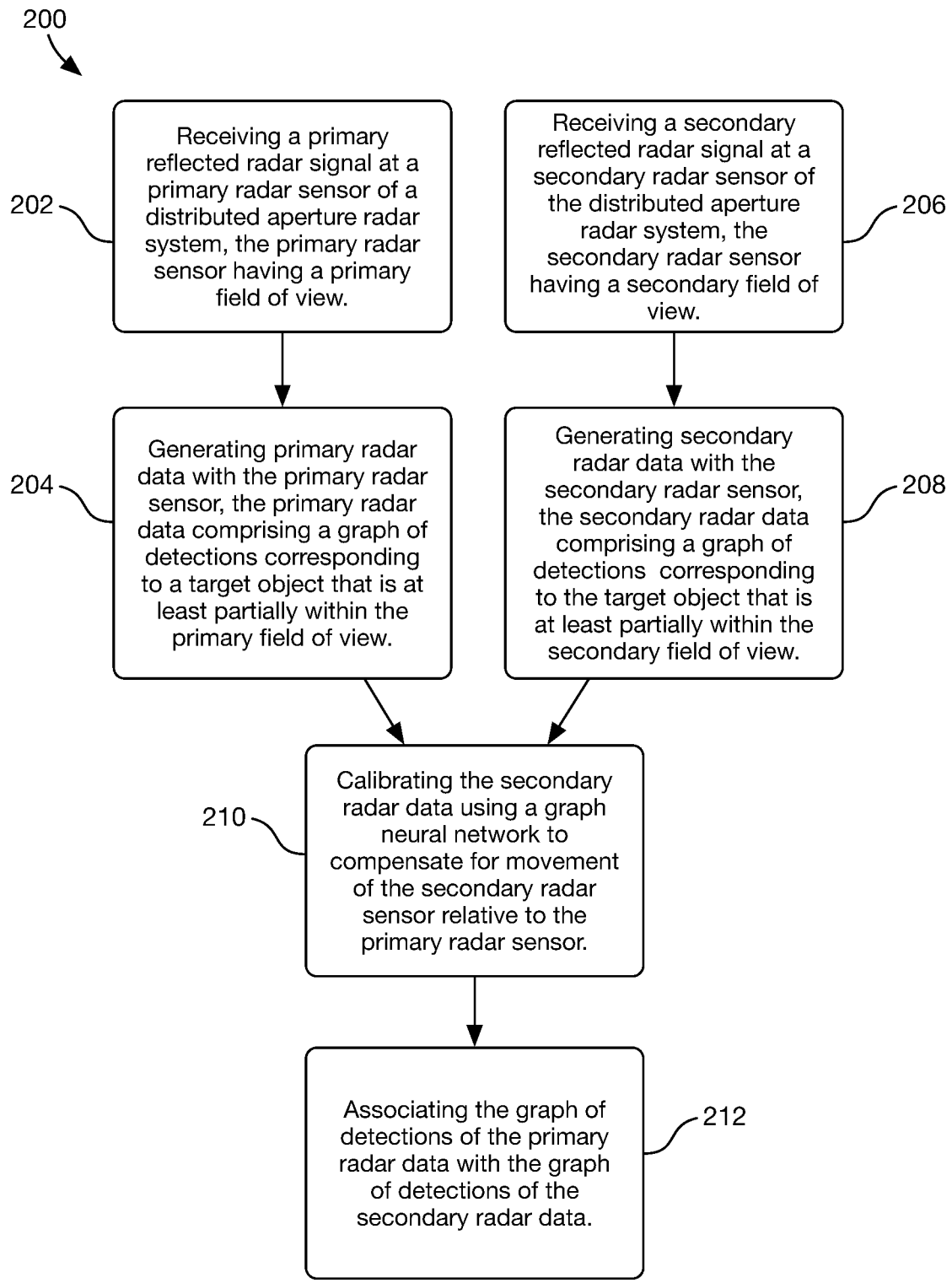
FIG. 3 is a flow diagram that illustrates an exemplary methodology for employing a neural network to calibrate and associate radar data generated by a distributed aperture radar system.
Figure 5:
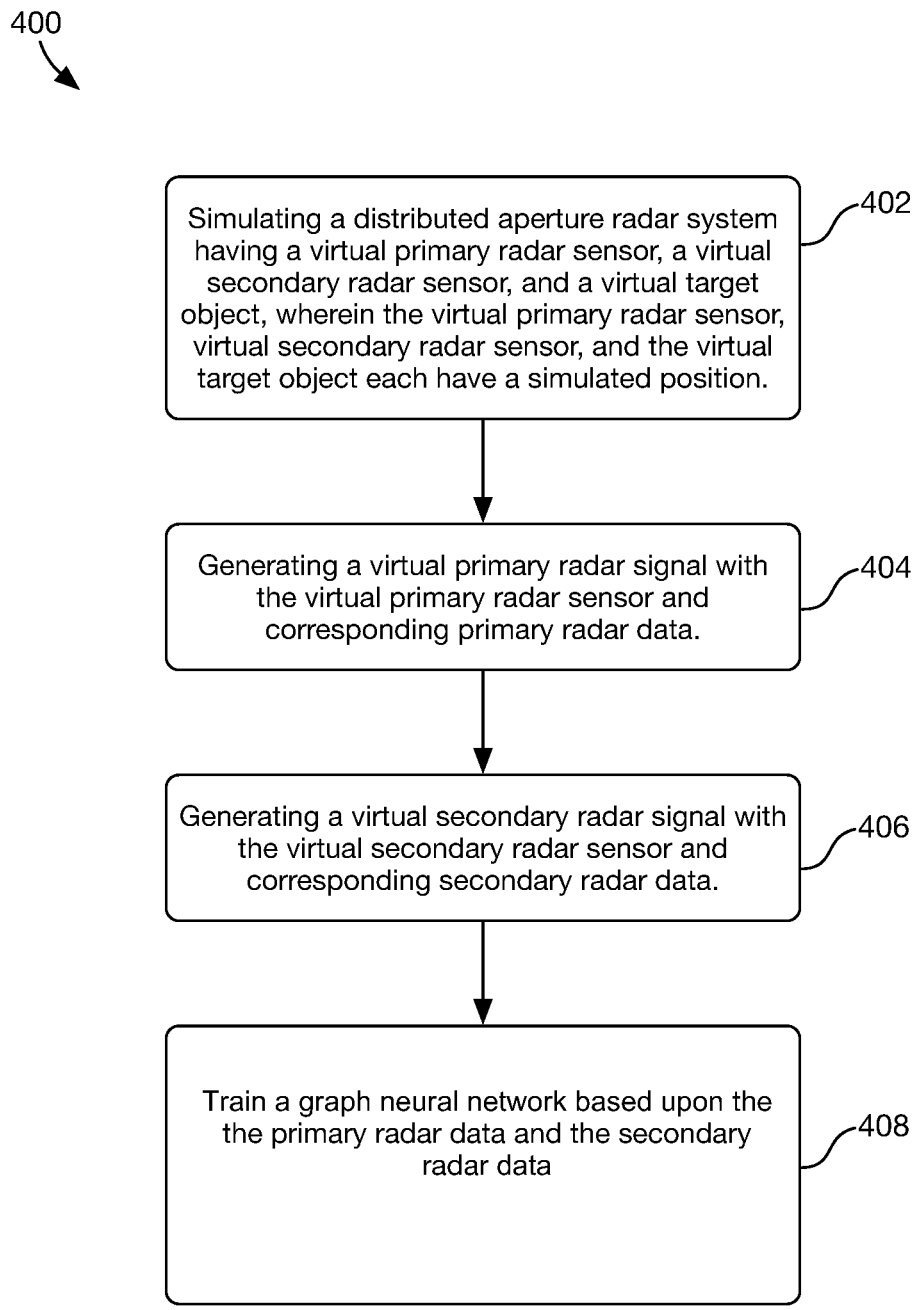
FIG. 5 is a flow diagram that illustrates an exemplary methodology for training a neural network to calibrate and associate radar data generated by a distributed aperture radar system.

FIGS. 3 and 5 illustrate exemplary methodologies relating to employing a graph neural network to calibrate and associate radar data online and training of the graph neural network for doing the same. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Radar systems typically generate radar data in the form of a radar tensor and/or a point cloud that is processed in various ways in connection with detecting and classifying objects in the environment. A radar tensor can include, for example, power measurements generated by the radar sensor along different dimensions, such as Doppler, range, azimuth, and elevation. The radar tensor is then further processed in order to detect, classify, and track objects in a scene over time. Identifying the location of a target object relative to the radar sensor facilitates autonomous navigation, for example.

The radar tensor and/or point cloud data generated by a radar sensor can be represented by a graph—e.g., vertices connected to other vertices by way of edges. This graph data is not structured in the same manner as, for example, a digital image that has pixels arranged in a grid having horizontal and vertical dimensions. Rather, the vertices and edges connecting the vertices have the same relationship even when observed from different points of view. The lack of structure in the graph data makes machine learning techniques that rely on the data structure—e.g., convolutional neural networks—less useful for the analysis of the graph data when compared to data that is structured in tabular format.

A distributed aperture radar ("DAR") system uses a network of radar sensors to detect the environment instead of a single radar sensor. The radar tensors generated by each radar sensor are combined to create a comprehensive view of the surroundings of the DAR system. Employing a DAR system to observe, detect, and track the objects surrounding a vehicle while the vehicle travels along a route is particularly useful because of the combined field of view offered by the use of many radar sensors. As noted above, however, attaching radar sensors to different locations on a vehicle and with different fields of view presents challenges. One issue that arises when using DAR systems is that the radar data from all of the radar sensors needs to be combined—e.g., associated such that the radar data appears to be generated by a single radar system—before processing the data to detect, classify, and track any target objects passing through the field of view of the DAR system. For example, a target object with a high angular velocity relative to the vehicle will have a different velocity detected by each radar sensor depending on the three-dimensional components of the velocity of the target object.

To associate the radar data from each radar sensor, one of the radar sensors is selected as a primary radar sensor and the radar data from each additional or secondary radar sensor is mapped to the coordinate system of the primary radar sensor using the relative position and orientation (relative to the primary radar sensor) of the secondary radar sensor that generated the radar data. While the theoretical position and orientation of the secondary radar sensor relative to the primary radar sensor is known, the actual position and orientation of the secondary radar sensor is likely different. Differences between a desired theoretical spatial relationship that arise from dimensional variability introduced during the manufacture of the vehicle can be addressed by calibrating the secondary radar sensor to the primary radar sensor in, for example, a final step of the manufacturing process for the vehicle.

However, factory calibration of the radar sensors does not account for dynamic differences in the relative position and orientation of the primary and secondary radar sensors that can result during operation of the vehicle; that is, the primary and secondary radar sensors and their associated mounting hardware can bounce, shake, bend, or otherwise move as the vehicle is driven over a typical road surface and the materials of the vehicle and mounting hardware elastically deform in response. These changes in the relative position of the primary and secondary radar sensors degrade the quality of the calculated position and velocity of the target object and cannot be accounted for via offline calibration of the radar sensors due to their unpredictable nature.

It should be noted that very small disturbances in the position of one of the radar sensors—on the scale of millimeters, tenths of millimeters, or smaller—can degrade the quality of the radar information because of the relatively small wavelength of the radar signals.

To account for the unpredictable variations in the relative position and orientation of the primary and secondary radar sensors, the radar data generated by the secondary radar sensors can be calibrated online—that is, through processing of the radar data by the onboard computer during the operation of the vehicle. Once the radar data has been calibrated, the radar data generated by the secondary radar sensor can be associated with the radar data generated by the primary radar sensor. Exemplary techniques for processing the radar data can accomplish online calibration and association of the radar data in real-time, thereby significantly improving the performance of DAR systems in dynamic environments. The calibrated and associated radar data enables the creation of coherent beamforming across the radar sensors in the DAR system. These exemplary techniques can also associate lidar data and radar data to further improve the situational awareness of the operator of the vehicle including an exemplary DAR system.

Referring now to FIG. 1, an illustration of an exemplary DAR system 100 is shown. The DAR system 100 is incorporated into a vehicle 102 that can be any kind of motor vehicle, such as, for example, a car, a truck, a van, or the like. In other examples, the DAR system 100 is incorporated into a water vehicle, an aerial vehicle (e.g., an airplane, a drone, etc.), and so forth. The DAR system 100 enables a computing system associated with the vehicle 102 to detect, classify, and track a target object 104 in an environment 106 surrounding the vehicle 102. The DAR system 100 includes a radar network 108 that includes a primary radar sensor 110 having a primary field of view 112 and at least one secondary radar sensor 114 having a secondary field of view 116, where the primary field of view and the secondary field of view overlap to form an overlapping region 118. The DAR system 100 can detect and track the target object 104 in the primary and/or secondary fields of view 112, 116. In an exemplary embodiment of the DAR system 100, the primary and secondary fields of view 112, 116 almost entirely or entirely overlap so that the overlapping region 118 forms a comprehensive view of the environment 106 surrounding the vehicle 102.

Figure 2:
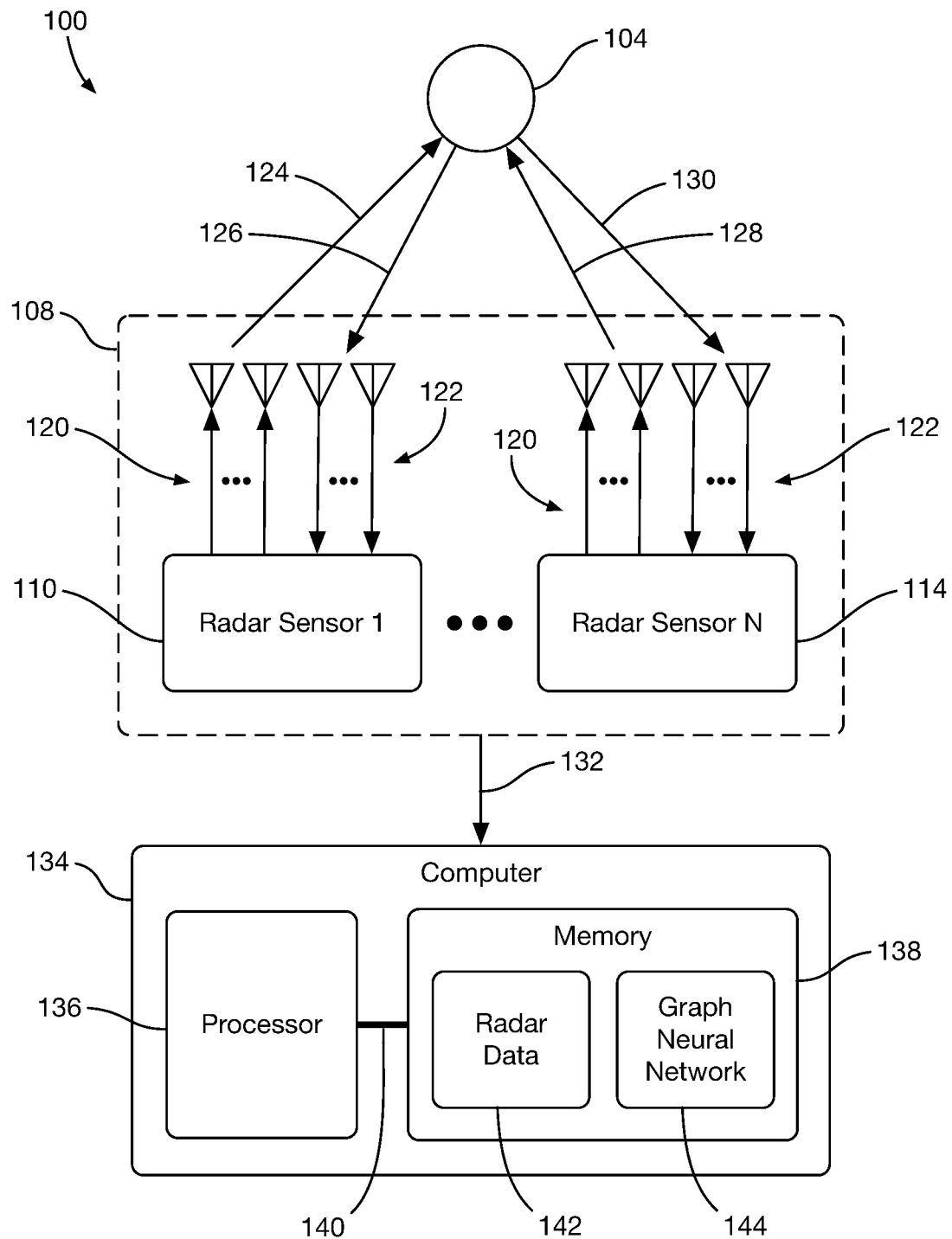
FIG. 2 shows a block diagram of a distributed aperture radar system and a computer for processing data generated by such system.

Referring now to FIG. 2, a block diagram of the DAR system 100 is shown. As described above, the radar network 108 of the DAR system 100 includes the primary radar sensor 110 and at least one secondary radar sensor 114—e.g., an array of radar sensors 110, 114 numbered from 1 to N. Any number of secondary radar sensors 114 can be included in the DAR system 100. In an exemplary embodiment, a single secondary radar sensor 114 is included in the DAR system 100 and is arranged so that the secondary field of view 116 almost or entirely overlaps with the primary field of view 112. In another example, the overlapping region 118 can be relatively small such that a relatively small number of radar systems is employed while obtaining 360 degree sensor coverage. Each of the radar sensors 110, 114 can be a multiple-input multiple-output (MIMO) radar sensor that includes a plurality of transmitting antennas 120 and a plurality of receiving antennas 122.

The primary and secondary radar sensors 110, 114 are configured to transmit and receive their own radar signals. The transmitting antennas 120 of the primary radar sensor 110 generate and transmit a primary transmitted radar signal 124 into the field of view 112. The primary transmitted radar signal 124 reflects off of the target object 104 as a primary reflected radar signal 126 and is received by the receiving antennas 122 of the primary radar sensor 110. The transmitting antennas 120 of the secondary radar sensor 114 generate and transmit a secondary transmitted radar signal 128 into the field of view 116. The secondary transmitted radar signal 128 reflects off of the target object 104 as a secondary reflected radar signal 130 and is received by the receiving antennas 122 of the secondary radar sensor 114. In an alternate embodiment, the primary radar sensor 110 and the secondary radar sensor 114 can receive radar signals transmitted from either radar sensor 110, 114. To receive and process a radar signal transmitted by either radar sensor 110, 114, the radar sensors 110, 114 may use the same oscillator or phase offset estimations will be required to compensate.

The primary radar sensor 110 and the secondary radar sensor 114 each receive and process their respective reflected radar signals 126, 130 to generate radar data that is sent by way of an output signal 132 to a central computer 134 for additional processing. The primary radar sensor 110 generates primary radar data comprising a graph that represents detections corresponding to the primary field of view 112 and including the target object 104. Similarly, the secondary radar sensor 114 generates secondary radar data comprising a graph that represents detections corresponding to the secondary field of view 116 and including the target object 104. The radar sensors 110, 114 can each process the analog radar data from the receiving antennas 122 to calculate whether the target object 104 is detected and estimate various properties of the target object 104 based on the radar data, such as, for example, the range, the velocity, the elevation, the azimuth, the radar cross-section, and the like. Various known techniques are used to determine these properties of the target object 104 from the radar data, such as, for example, a range fast Fourier transform (FFT), a Doppler FFT, a beamforming FFT or discrete Fourier transform (DFT), and the like. The calculations to determine the properties of the radar data can be performed by processors in each of the radar sensors 110, 114 or by the central computer 134 and can be calculated for each radar sensor 110, 114 array element—e.g., each pair of transmitting and receiving antennas 120, 122—and also in each range and Doppler cell. When calculating properties of the radar data for the secondary radar sensor 114, the relative position of the transmitting antennas 120 and receiving antennas 122 of the secondary radar sensor 114 to the transmitting antennas 120 and receiving antennas 122 of the primary radar sensor 110 is incorporated into the processing of the radar data to generate the output signal 132.

Referring again to FIG. 2, a high-level illustration of an exemplary central computer 134 that can be used in accordance with the systems and methodologies disclosed herein is illustrated. The central computer 134 includes at least one processor 136 that executes instructions that are stored in a memory 138. The memory 138 encompasses memory used for temporary storage of information (e.g., RAM) and memory used for long-term storage of information (e.g., data storage devices such as hard drives). The instructions may be, for instance, instructions for implementing functionality described as being carried out by one or more components discussed herein or instructions for implementing one or more of the methods described herein. The processor 136 may access the memory 138 by way of a system bus 140. In addition to storing executable instructions, the memory 138 may also store radar data 142 received from the output signal 132 of the radar network 108—i.e., radar data including detected target objects 104 and properties relating to the target objects 104 calculated for each radar sensor 110, 114. The central computer 134 optionally includes an input interface (not shown) that allows external devices to communicate with the central computer 134. For instance, the input interface may be used to receive instructions from an external computer device, from a user, etc. The central computer 134 also optionally includes an output interface (not shown) that interfaces the central computer 134 with one or more external devices. For example, the central computer 134 may display text, images, etc. by way of the output interface.

It is contemplated that the external devices that communicate with the central computer 134 via the input interface and the output interface can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the central computer 134 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the central computer 134 may be a distributed system. Thus, for instance, several devices may be in communication by way of a network connection and may collectively perform tasks described as being performed by the central computer 134.

The output signal 132 is recorded to the memory 138 as radar data 140 to be processed by a graph neural network 142 (GNN) that is also stored in the memory 138. The radar data in the output signal 132 generated by the secondary radar sensor 114 is processed by way of the graph neural network 142 to compensate for variations in the position of the secondary radar sensor 114; e.g., to calibrate the radar date generated by the secondary radar sensor 114. In an exemplary embodiment, the graph neural network 142 estimates a calibration matrix—e.g., a transformation matrix including a rotation matrix and a distance vector—that maps the radar data generated by the secondary radar sensor 114 into the coordinate system of the radar data generated by the primary radar sensor 110, thereby forming a single set of radar data in the same coordinate system. The incoming output signal 132 from the radar network 108 is continuously processed by the central computer 132 so that the graph neural network 142 generates new calibration matrices to compensate for ongoing movement of the secondary radar sensor 114 relative to the primary radar sensor 110.

The radar data contained in the output signal 132 originates from a non-Euclidian space so that a GNN is better suited to process the radar data than other types of neural networks. That is, the radar data can be understood using a graph structure—i.e., a plurality of vertices or nodes connected by edges—that is processed through the GNN. The GNN receives unordered sets of points with varying input sizes expressed as a graph and determines the relationship between those points or vertices to generate embeddings associated with each point. In this way, each point or node in the graph includes aggregated knowledge about neighboring nodes in the graph that can be used to predict features of other nodes. These relationships are retained even when the points are viewed from a slightly different perspective, making GNNs particularly useful in processing the radar data of the output signal 132. For example, the GNN 142 can determine which of the points in the radar data corresponds to a target object 104 and which points nearby have a strong or a weak relationship to the points corresponding to the target object 104. During operation of the DAR system 100, the GNN 142 determines the calibration matrix between the secondary radar sensor 114 and the primary radar sensor 110 and also associates or matches the various radar detections to provide a more comprehensive view of the environment 106 around the DAR system 100.

When the radar data in the output signal 132 is calibrated and associated, a beam forming calculation can be performed on the primary and secondary radar data using a wide variety of techniques, such as, for example, FFT, DFT, compressive sensing, machine learning, or the like. For the beamforming calculation, the transmitted signals 124, 130 from the primary and secondary radar sensors 110, 114 do not need to be time synchronous but the transmission time difference between the radar sensors 110, 114 is smaller than the possible range or doppler migration of the target object 104 during measurement. The radar sensors 110, 114 in the radar network 108 can also have different arrays—different positions of the transmitting and receiving antennas 120, 122—so that the joint beamforming result will have different sidelobes, thereby enabling the estimation of false detections by sidelobes. After beamforming using the calibrated and associated data from the DAR system 100, the azimuth angle and elevation angle of the target object relative to the DAR system 100 can be more accurately estimated.

Referring now to FIG. 3, a methodology 200 that facilitates the use of a GNN for online calibration and association of radar data from a DAR system is shown. The methodology 200 begins at 202 with receiving a primary reflected radar signal at a primary radar sensor of a distributed aperture radar system, the primary radar sensor having a primary field of view. At 204, primary radar data is generated by the primary radar sensor, the primary radar data comprising a graph of detections corresponding to a target object that is at least partially within the primary field of view. A secondary radar signal is received at 206 by a secondary radar sensor of the distributed aperture radar system, the secondary radar sensor having a secondary field of view. Similar to step 204, at 208 the secondary radar sensor generates secondary radar data comprising a graph of detections corresponding to the target object that is at least partially within the secondary field of view. The secondary radar data is calibrated at 210 using a GNN to compensate for movement of the secondary radar sensor relative to the primary radar sensor. Associating the radar detections in the secondary radar data to the radar detections in the primary radar data is performed with the GNN at 212. The steps of calibrating at 210 and associating at 212 can be performed with the GNN sequentially or simultaneously.

Figure 4:
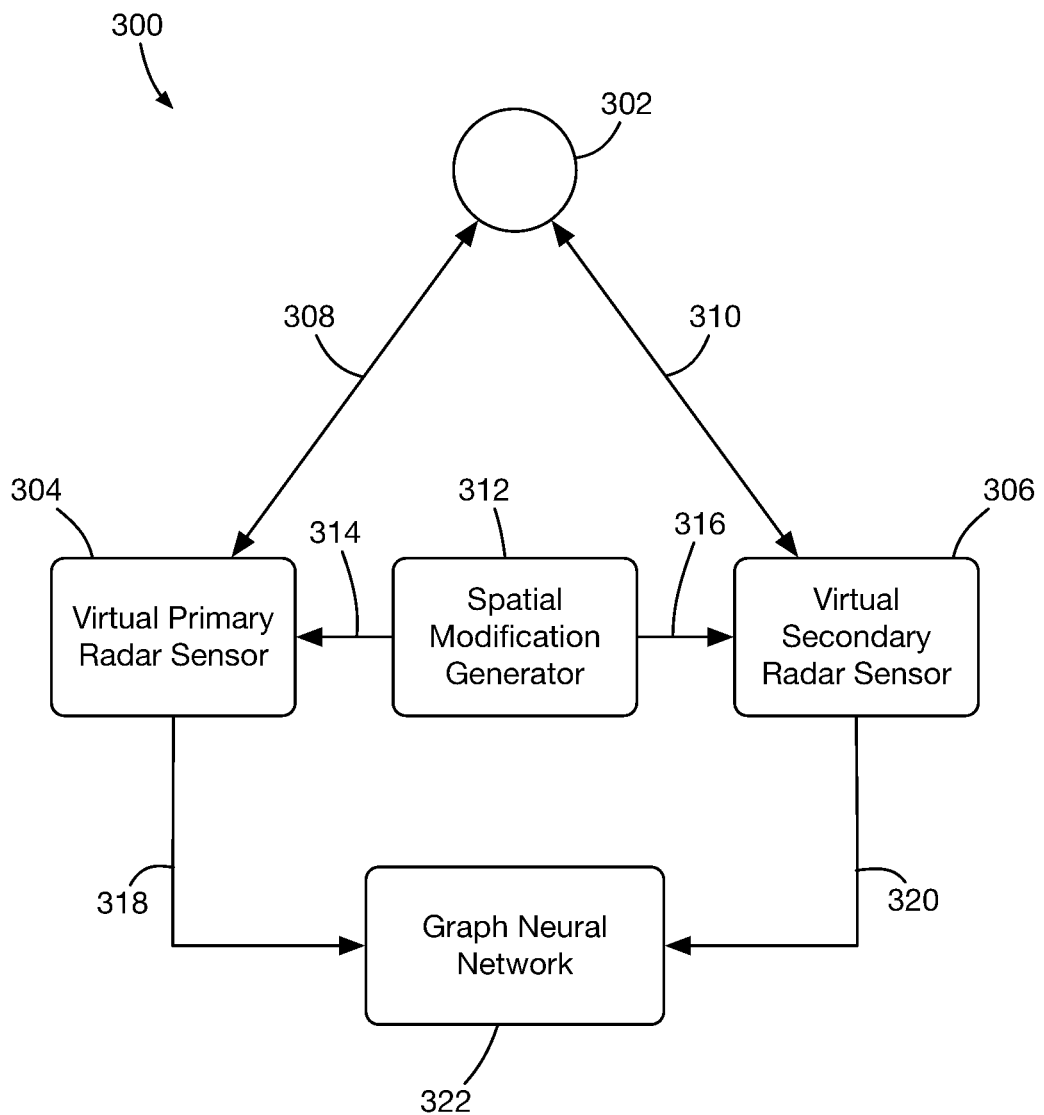
FIG. 4 shows a block diagram of a system for training a neural network to calibrate radar data.

Referring now to FIG. 4, a training system 300 for generating training data for a DAR system is illustrated. The components of the training system 300 described herein are simulated in a computer system to alleviate the need for collecting data from vehicles on roadways. The training system 300 includes a virtual target object 302, a virtual primary radar sensor 304, and a virtual secondary radar sensor 306. Primary radar signals 308 and secondary radar signals 310 are simulated being transmitted and received by the primary radar sensor 304 and the secondary radar sensor 306, respectively. The spatial relationship between the virtual target object 302, virtual primary radar sensor 304, and virtual secondary radar sensor 306 is known and can be employed in connection with computing transformation matrices between different sets of radar data generated by different radar systems in a DAR system.

The training system 300 also includes a spatial modification generator 312 that generates a first spatial modification 314 and/or a second spatial modification 316 that alters the position of the virtual radar sensors 304, 306 to simulate movement of the virtual radar sensors 304, 306 relative to one another (e.g., as if a vehicle were driving along a roadway). Because the first and second spatial modifications 314, 316 are generated in a simulated environment of the training system 300, the position of the radar sensors 304, 306 before and after modification is known. Consequently, the correct transformation matrix for mapping secondary radar data 320 generated by the virtual secondary radar sensor 306 to primary radar data generated 318 by the virtual primary radar sensor 304 can be readily computed. Hence, the training system 300 can generate labeled training data, where the target of training are transformation matrices.

The primary radar data 318, the secondary radar data 320, and the calculated transformation matrices between the primary and secondary radar data are employed to train to a graph neural network 322 (GNN). By training the GNN 322 with simulated radar data 318, 320, a significant amount of development time can be saved. Having been trained, the GNN 322 can be used to process real world radar data from two or more radar sensors to calibrate and associate data from secondary radar sensors to a primary radar sensor online.

Referring now to FIG. 5, a methodology 400 that facilitates the training of a graph neural network for online calibration and association of radar data from a DAR system is shown. The methodology 400 begins at 402 with simulating a DAR system including a virtual primary radar sensor, a virtual secondary radar sensor, a virtual target object, and virtual primary and secondary radar signals generated by the virtual primary and secondary radar sensors, respectively. Spatial modifications are generated and applied to the virtual primary and/or virtual secondary radar sensors at 404 to alter the simulated position of the virtual primary and/or virtual secondary radar sensors. At 406, simulated primary radar data is generated by the virtual primary radar sensor and simulated secondary radar data is generated by the virtual secondary radar sensor. The simulated primary and secondary radar data are employed to train a GNN at 408. While the methodology 400 is described as being performed in a simulated environment, a similar training process can be performed using real data where the movement-vibrations, oscillations, etc.—of primary and secondary radar sensors is tracked and other techniques, such as Lidar, are used to track the position of the target object. The data gathered in the real-world environment can be used to train the GNN offline in a manner similar to that described above. The trained GNN is employed in a vehicle including a primary radar sensor and a plurality of secondary radar sensors to process the radar data generated by the radar sensors. Because the GNN has been trained to calibrate and associate radar data of moving radar sensors via the training methodology 400, the GNN can similarly calibrate and associate real-world radar data.

Examples of methodologies and systems for calibrating and associating radar data from a distributed aperture radar network are described herein.

An exemplary method of a method performed by a radar system includes steps of receiving primary and secondary reflected radar signals at a primary and secondary radar sensors of a distributed aperture radar system and generating primary and secondary radar data with the primary and secondary radar sensors. The primary and secondary radar data include graphs of detections corresponding to a target object that is at least partially within a primary field of view of the primary sensor and a secondary field of view of the secondary sensor. The method further includes steps of calibrating the secondary radar data using a graph neural network to compensate for movement of the secondary radar sensor relative to the primary radar sensor and associating the graph of detections of the primary radar data with the graph of detections of the secondary radar data.

In an exemplary method of operating an exemplary radar system, the steps of calibrating and associating are performed simultaneously.

Another exemplary method of operating an exemplary radar system includes steps of beamforming the calibrated and associated radar data and estimating an azimuth angle and an elevation angle from the distributed aperture network to the target object based on the beamforming of the calibrated and associated radar data.

An exemplary method of operating an exemplary radar system can also include steps of receiving a reflected lidar signal at a lidar sensor, the lidar sensor having a lidar field of view that overlaps the primary field of view and the secondary field of view; generating lidar data based on the reflected lidar signal, the lidar data comprising a graph of detections corresponding to the target object; and processing the lidar data through the graph neural network.

Yet another exemplary method of operating an exemplary radar system, wherein the primary radar sensor and the secondary radar sensor are each multiple-input multiple-output radar sensors.

In another exemplary radar system operated by an exemplary method, the graph neural network is trained using a simulated distributed aperture radar system.

An example of a method of training a graph neural network to calibrate and associate radar data from a distributed aperture radar system includes steps of simulating a distributed aperture radar system, generating virtual radar signals and corresponding radar data, and training the graph neural network based upon the virtual radar signals. The simulated distributed aperture radar system has a virtual primary radar sensor, a virtual secondary radar sensor, and a virtual target object. The virtual primary radar sensor, virtual secondary radar sensor, and the virtual target object each have a simulated position. The virtual radar sensors generate virtual radar signals and the corresponding radar data. Training the graph neural network further includes computing transformation matrices between the virtual primary radar sensor and the virtual secondary radar sensor based upon the simulated positions of the sensors and training the graph neural network based upon the computed transformation matrices.

In an example method of training a graph neural network, the method can also include providing position data corresponding to and radar data generated by real-world primary and secondary radar sensors mounted on a vehicle.

In another example of a method of training a graph neural network, the method includes providing lidar data generated by a lidar sensor mounted on the vehicle to the graph neural network.

Yet another method of training a graph neural network with virtual primary and secondary radar sensors, wherein a primary field of view of the virtual primary radar sensor overlaps at least a portion of a secondary field of view of the virtual secondary radar sensor to form an overlapping region.

In another method of training a graph neural network, the simulated position of the virtual target object is arranged in the overlapping region of the fields of view of the virtual radar sensors.

An example of a distributed aperture radar system includes a radar array and a computer. The radar array has: a primary radar sensor having a primary field of view; and a secondary radar sensor having a secondary field of view, the secondary field of view overlapping at least a portion of the primary field of view. The primary radar sensor generates primary radar data comprising a graph of detections corresponding to the primary field of view and including a target object and the secondary radar sensor generates secondary radar data comprising a graph of detections corresponding to the secondary field of view and including the target object. The computer has a processor and memory and is configured to: store the primary and secondary radar data in the memory; process the radar data through a graph neural network, wherein the graph neural network is stored in the memory and is executed by the processor; use the graph neural network to determine a calibration matrix between the secondary radar sensor and the primary radar sensor based on the primary and secondary radar data; and use the graph neural network to associate the graph of detections of the secondary radar data with the graph of detections of the primary radar data.

In an example of a distributed aperture system the primary radar sensor and the secondary radar sensor each comprise a plurality of transmitting antennas and a plurality of corresponding receiving antennas.

In another distributed aperture radar system, the primary and secondary radar sensors are configured to receive radar signals transmitted by either of the primary and secondary radar sensors.

An example of a distributed aperture radar system includes a graph neural network that simultaneously calibrates the secondary radar data and associates the graphs of detections of the primary and secondary radar data.

Another example of a distributed aperture radar system has a computer that is configured to perform a beamforming calculation using the calibrated and associated primary and secondary radar data.

Yet another example of a distributed aperture radar system has a primary radar sensor and a secondary radar sensor that are attached to a vehicle.

Still another exemplary distributed aperture radar system includes a lidar system having a lidar field of view that overlaps at least a portion of each of the primary field of view and the secondary field of view.

Another exemplary distributed aperture radar system has a radar array that includes a plurality of secondary radar sensors.

In another exemplary distributed aperture radar system, the graph neural network is trained using a simulated distributed aperture radar system.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:
   receiving a primary reflected radar signal at a primary radar sensor of a distributed aperture radar system, the primary radar sensor having a primary field of view;
   generating primary radar data with the primary radar sensor, the primary radar data comprising a first graph of detections corresponding to a target object that is at least partially within the primary field of view;
   receiving a secondary reflected radar signal at a secondary radar sensor of the distributed aperture radar system, the secondary radar sensor having a secondary field of view;
   generating secondary radar data with the secondary radar sensor, the secondary radar data comprising a second graph of detections corresponding to the target object that is at least partially within the secondary field of view;

calibrating the secondary radar data using a graph neural network to compensate for movement of the secondary radar sensor relative to the primary radar sensor; and associating the first graph of detections with the second graph of detections based upon the calibrating of the secondary radar data.

2. The method of claim 1, wherein calibrating the secondary radar data comprises computing a transformation matrix that, when applied to the secondary radar data, causes the secondary radar data to be placed in a coordinate system of the primary radar data.

3. The method of claim 1, further comprising:

beamforming the calibrated and associated radar data; and estimating an azimuth angle and an elevation angle from the distributed aperture network to the target object based on the beamforming of the calibrated and associated radar data.

4. The method of claim 1, further comprising:

receiving a reflected lidar signal at a lidar sensor, the lidar sensor having a lidar field of view that overlaps the primary field of view and the secondary field of view;

generating lidar data based on the reflected lidar signal, the lidar data comprising a graph of detections corresponding to the target object; and processing the lidar data through the graph neural network.

5. The method of claim 1, wherein the primary radar sensor and the secondary radar sensor are each multiple-input multiple-output radar sensors.

6. The method of claim 1, wherein the graph neural network is trained with a simulated distributed aperture radar system.

7. A distributed aperture radar (DAR) system comprising:

a radar array comprising:

a primary radar sensor having a primary field of view;

a secondary radar sensor having a secondary field of view, the secondary field of view overlapping at least a portion of the primary field of view;

wherein the primary radar sensor generates primary radar data comprising a graph of detections and raw radar data corresponding to the primary field of view and including a target object; and wherein the secondary radar sensor generates secondary radar data comprising a graph of detections corresponding to the secondary field of view and including the target object;

a computer comprising a processor and memory, where the computer processor is configured to:

store the primary and secondary radar data in the memory;

provide the primary radar data and the secondary radar data as input to a graph neural network, wherein the graph neural network is stored in the memory and is executed by the processor, and further where the graph neural network outputs a transformation matrix based upon the radar data; and apply the transformation matrix to the secondary radar data such that the secondary radar data is transformed to share a coordinate system with the primary radar data.

8. The DAR system of claim 7, wherein the primary radar sensor and the secondary radar sensor each comprise a plurality of transmitting antennas and a plurality of corresponding receiving antennas.

9. The DAR system of claim 7, wherein the primary and secondary radar sensors are configured to receive radar signals transmitted by either of the primary and secondary radar sensors.

10. The DAR system of claim 7, wherein the graph neural network has been trained based upon simulated training data.

11. The DAR system of claim 7, wherein the computer is configured to perform a beamforming calculation using the secondary radar after transformation of the secondary radar data.

12. The DAR system of claim 7, wherein the primary radar sensor and the secondary radar sensor are attached to a vehicle.

13. The DAR system of claim 7, further comprising a lidar system having a lidar field of view that overlaps at least a portion of each of the primary field of view and the secondary field of view.

14. The DAR system of claim 7, wherein the radar array comprises a plurality of secondary radar sensors.

15. An autonomous vehicle (AV) comprising:

a propulsion system;

a steering system;

a braking system;

a distributed aperture radar (DAR) system that includes a first radar sensor and a second radar sensor, where the first radar sensor generates first radar data and the second radar sensor generates second radar data; and a computing system in communication with the propulsion system, the steering system, the braking system, and the DAR system, where the computing system is programmed to perform acts, the acts comprising:

receiving the first radar data and the second radar data;

using a graph neural network (GNN), computing a transformation matrix based upon the first radar data and the second radar data;

using the transformation matrix, transforming the second radar data such that the second radar data is in a coordinate system of the first radar data;

subsequent to transforming the second radar data, computing at least one of location of an object relative to the first radar sensor or velocity of the object relative to the first radar sensor based upon the transformed second radar data; and controlling at least one of the propulsion system, the steering system, or the braking system based upon the at least one of the location of the object or the velocity of the object.

16. The AV of claim 15, where the first radar system includes a plurality of receive antennas.

17. The AV of claim 15, where the second radar system includes a second plurality of receive antennas.

18. The AV of claim 15, where the first radar data and the second radar data are graphs that correspond to radar tensors generated by the first radar sensor and the second radar sensor.

19. The AV of claim 15, where the GNN is trained based upon simulated radar data.

20. The AV of claim 15, where the first radar sensor has a first field of view, the second radar sensor has a second field of view, and further where the first field of view and the second field of view overlap.

* * * * *